United States Patent
Lieberman et al.

(10) Patent No.: US 10,860,433 B1
(45) Date of Patent: Dec. 8, 2020

(54) DIRECTIONAL CONSISTENCY IN CAPTURE AND RECOVERY OF CLOUD-NATIVE APPLICATIONS

(71) Applicant: EMC IP Holding Company LLC, Hopkinton, MA (US)

(72) Inventors: Amit Lieberman, Raanana (IL); Assaf Natanzon, Tel Aviv (IL)

(73) Assignee: EMC IP Holding Company LLC, Hopkinton, MA (US)

(*) Notice: Subject to any disclaimer, the term of this patent is extended or adjusted under 35 U.S.C. 154(b) by 284 days.

(21) Appl. No.: 15/791,799

(22) Filed: Oct. 24, 2017

(51) Int. Cl.
*G06F 16/23* (2019.01)
*G06F 11/14* (2006.01)

(52) U.S. Cl.
CPC ...... *G06F 11/1464* (2013.01); *G06F 16/2365* (2019.01); *G06F 2201/84* (2013.01)

(58) Field of Classification Search
CPC .. G06F 11/14; G06F 11/1451; G06F 11/1453; G06F 11/1456; G06F 11/1458; G06F 11/1464; G06F 16/182; G06F 2201/815; G06F 2201/84; G06F 3/0604; G06F 3/0619; G06F 3/0649; G06F 3/065
See application file for complete search history.

(56) References Cited

U.S. PATENT DOCUMENTS

| | | | |
|---|---|---|---|
| 6,067,550 A | 5/2000 | Lomet | |
| 6,490,594 B1 | 12/2002 | Lomet | |
| 6,978,279 B1 | 12/2005 | Lomet et al. | |
| 7,386,752 B1 | 6/2008 | Rakic et al. | |
| 8,577,842 B1 * | 11/2013 | Nagargadde | G06F 11/1464 707/639 |
| 8,713,362 B2 | 4/2014 | Griffith et al. | |

(Continued)

OTHER PUBLICATIONS

Amazon Web Services, Inc., "AWS Serverless Mutli-Tier Architectures Using Amazon API Gateway and AWS Lambda," Amazon Web Services, Nov. 2015, 20 pages.

(Continued)

*Primary Examiner* — Taelor Kim
(74) *Attorney, Agent, or Firm* — Ryan, Mason & Lewis, LLP

(57) ABSTRACT

An apparatus in one embodiment comprises at least one processing platform including a plurality of processing devices. The processing platform is configured to execute a cloud-native application utilizing a plurality of micro-services each associated with a different set of one or more underlying databases, to capture state of the cloud-native application for a particular point in time, and to perform operational recovery of the cloud-native application for the particular point in time utilizing the captured state. Capturing state of the cloud-native application for the particular point in time comprises capturing the state in accordance with a directional dependency graph that characterizes relationships between the micro-services and the associated databases utilized in executing the cloud-native application in order to ensure directional consistency between the databases in the captured state. Performing operational recovery of the cloud-native application for the particular point in time utilizing the captured state comprises performing the operational recovery in accordance with the directional dependency graph.

20 Claims, 5 Drawing Sheets

(56) References Cited

U.S. PATENT DOCUMENTS

| | | |
|---|---|---|
| 9,461,969 B2 | 10/2016 | Watt |
| 9,477,415 B2 | 10/2016 | Hsu et al. |
| 9,619,350 B1 | 4/2017 | Ambat et al. |
| 9,684,607 B2 | 6/2017 | Teletia et al. |
| 9,893,947 B2 | 2/2018 | Morgan et al. |
| 9,906,415 B2 | 2/2018 | Morgan et al. |
| 10,248,345 B1 | 4/2019 | Dickson |
| 10,409,995 B1 | 9/2019 | Wasiq et al. |
| 2001/0049704 A1 | 12/2001 | Hamburg et al. |
| 2006/0041602 A1 | 2/2006 | Lomet et al. |
| 2008/0115134 A1 | 5/2008 | Elliott et al. |
| 2008/0307347 A1 | 12/2008 | Cisler et al. |
| 2009/0157882 A1 | 6/2009 | Kashyap |
| 2010/0049929 A1 | 2/2010 | Nagarkar et al. |
| 2012/0233123 A1 | 9/2012 | Shisheng et al. |
| 2014/0149354 A1 | 5/2014 | Chan et al. |
| 2015/0096011 A1 | 4/2015 | Watt |
| 2015/0317216 A1 | 11/2015 | Hsu et al. |
| 2015/0355985 A1 | 12/2015 | Holtz et al. |
| 2016/0162378 A1 * | 6/2016 | Garlapati ............ G06F 11/2002 714/4.12 |
| 2016/0170666 A1 | 6/2016 | Hsu et al. |
| 2016/0246735 A1 | 8/2016 | Teletia et al. |
| 2016/0292045 A1 | 10/2016 | Pillai et al. |
| 2017/0060605 A1 | 3/2017 | Huang et al. |
| 2017/0255474 A1 | 9/2017 | Yu et al. |
| 2017/0270055 A1 | 9/2017 | Teletia et al. |
| 2017/0352115 A1 | 12/2017 | Trevathan et al. |
| 2019/0182128 A1 * | 6/2019 | Shimamura ......... H04L 41/5045 |

OTHER PUBLICATIONS

"AWS Step Functions, Build Distributed Applications Using Visual Workflows," https://aws.amazon.com/step-functions/,2017, 2 pages.

Amazon Web Services, Inc., "AWS Lambda Developer Guide," Amazon Web Services, 2017, 473 pages.

wikipedia.com, "Serverless Computing," https://en.wikipedia.org/wiki/Serverless_computing, Jul. 17, 2017, 4 pages.

U.S. Appl. No. 15/666,793 filed in the name of Assaf Natanzon et al. filed Aug. 2, 2017 and entitled "Operational Recovery of Serverless Applications in a Cloud-Based Compute Services Platform."

U.S. Patent Application filed in the name of Assaf Natanzon et al. on Oct. 24, 2017 and entitled "Automated Capture and Recovery of Applications in a Function-as-a-Service Environment."

* cited by examiner

US 10,860,433 B1

DIRECTIONAL CONSISTENCY IN CAPTURE AND RECOVERY OF CLOUD-NATIVE APPLICATIONS

FIELD

The field relates generally to information processing systems, and more particularly to compute services in information processing systems.

BACKGROUND

Many information processing systems are configured to provide cloud-based compute services to users over a network. In some cases, the compute services are accessed via so-called cloud-native applications, which are typically configured in accordance with a distributed application architecture that utilizes open, common standards and that is dynamic in nature and highly scalable. Cloud-native applications often leverage open-source technologies and focus on transparency and interoperability. A given cloud-native application may be configured to utilize multiple distinct micro-services, potentially provided and managed by different entities, with each of the micro-services being associated with a distinct set of one or more databases, in order to deploy and scale corresponding compute services independently and as needed. However, in conventional practice, it can be difficult to ensure desired levels of consistency between different databases utilized by different micro-services in capture and recovery of the given cloud-native application.

SUMMARY

Illustrative embodiments provide techniques for capture and recovery of cloud-native applications in a cloud-based compute services platform. For example, some embodiments are configured to implement automated capture of cloud-native application state utilizing a corresponding directional dependency graph to ensure directional consistency in the capture and recovery operations. Such embodiments can advantageously provide directional consistency in automated state capture and operational recovery of cloud-native applications from desired points in time. The directional dependency graph illustratively comprises a root node and a plurality of additional nodes, with each of at least a subset of the nodes corresponding to a different one of the databases. Directional edges between respective pairs of the nodes indicate dependency relationships between the corresponding databases. For example, a directional dependency between a given pair of databases may be based on an indication that entries of one of the databases point to entries of the other database. The directional dependency graph may be at least partially defined by a user of the cloud-native application. For example, a user can define the dependency relationships that give rise to respective directional edges between respective pairs of nodes in the graph.

In one embodiment, an apparatus comprises at least one processing platform including a plurality of processing devices. The processing platform is configured to execute a cloud-native application utilizing a plurality of micro-services each associated with a different set of one or more underlying databases, to capture state of the cloud-native application for a particular point in time, and to perform operational recovery of the cloud-native application for the particular point in time utilizing the captured state.

Capturing state of the cloud-native application for the particular point in time comprises capturing the state in accordance with a directional dependency graph that characterizes relationships between the micro-services and the associated databases utilized in executing the cloud-native application in order to ensure directional consistency between the databases in the captured state.

For example, capturing state of the cloud-native application for the particular point in time illustratively comprises creating backup copies of the databases via respective copy application programming interfaces in accordance with a copy sequence defined by interconnections between nodes of the directional dependency graph.

Performing operational recovery of the cloud-native application for the particular point in time utilizing the captured state comprises performing the operational recovery in accordance with the directional dependency graph.

For example, performing operational recovery of the cloud-native application for the particular point in time utilizing the captured state illustratively comprises recovering the databases from backup copies via respective restore application programming interfaces in accordance with a restore sequence defined by interconnections between nodes of the directional dependency graph.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
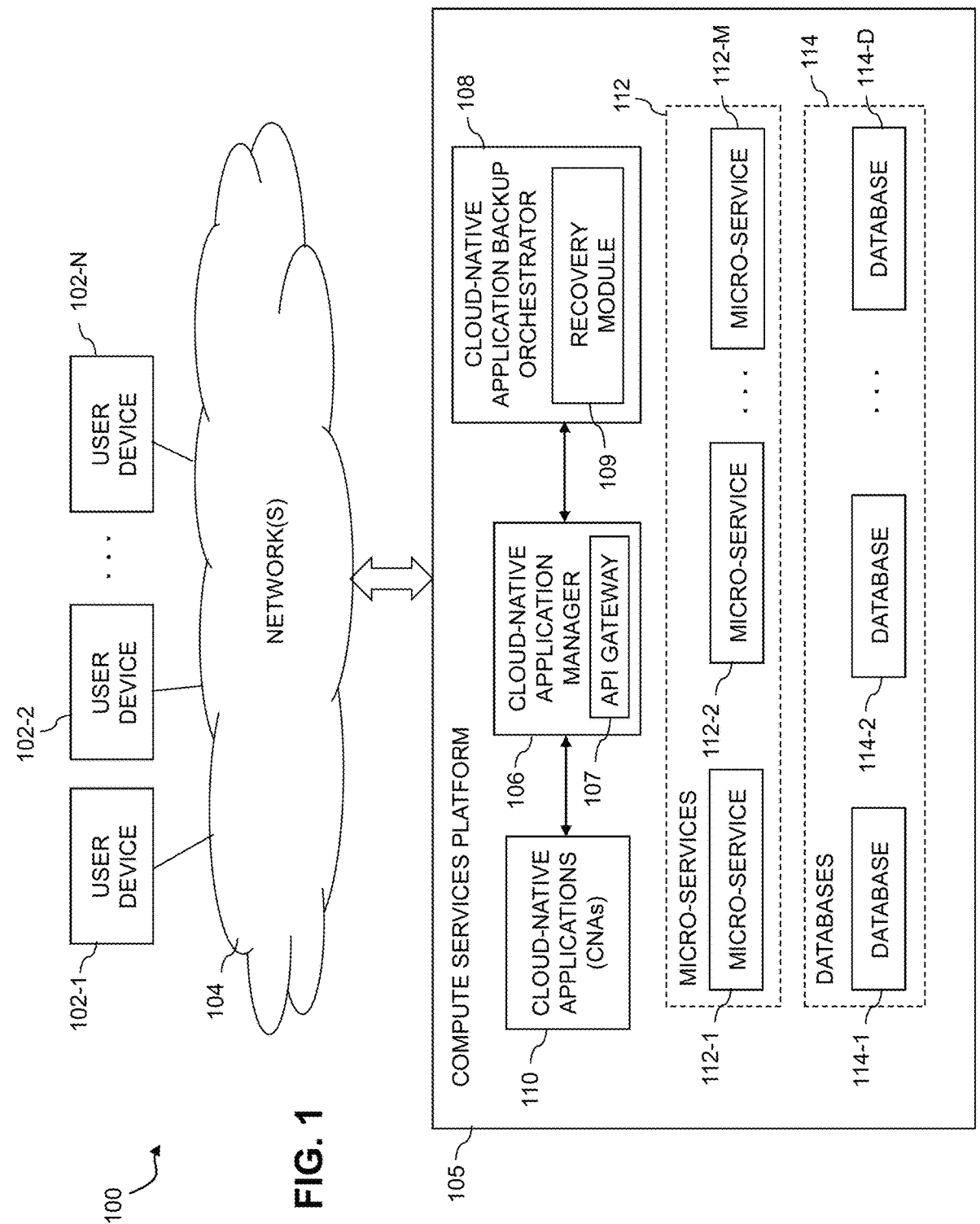
FIG. 1 is a block diagram of an information processing system comprising a cloud-based compute services platform configured for state capture and operational recovery of cloud-native applications in an illustrative embodiment.

FIG. 1 shows an information processing system 100 configured in accordance with an illustrative embodiment. The information processing system 100 comprises user devices 102-1, 102-2, . . . 102-N. The user devices 102 communicate over a network 104 with a compute services platform 105.

The user devices 102 can comprise, for example, desktop, laptop or tablet computers, mobile telephones, or other types of processing devices capable of communicating with the compute services platform 105 over the network 104. The variable N and other similar index variables herein such as M and D are assumed to be arbitrary positive integers greater than or equal to two.

The term "user" herein is intended to be broadly construed so as to encompass numerous arrangements of human, hardware, software or firmware entities, as well as combinations of such entities. Compute services may be provided for users under a platform-as-a-service (PaaS) model, although it is to be appreciated that numerous other cloud infrastructure arrangements could be used.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniB and, Gigabit Ethernet or Fibre Channel. Numerous alternative networking arrangements are possible in a given embodiment, as will be appreciated by those skilled in the art.

The compute services platform 105 implements compute services on behalf of respective cloud infrastructure tenants each corresponding to one or more users associated with respective ones of the user devices 102. The compute services are assumed to include execution of one or more cloud-native applications on behalf of each of one or more users associated with respective user devices 102. The cloud-native applications in some cases comprise serverless applications provided by the compute services platform 105 under a Function-as-a-Service (FaaS) model, although illustrative embodiments are not limited to serverless applications.

The compute services platform 105 in some embodiments may be implemented as part of cloud infrastructure in the form of a cloud-based system such as an Amazon Web Services (AWS) system. Other examples of cloud-based systems that can be used to provide at least portions of the compute services platform 105 and possibly other portions of system 100 include Google Cloud Platform (GCP) and Microsoft Azure.

As a more particular example, the compute services platform 105 in some embodiments may be configured to implement a serverless application architecture similar to the AWS Lambda serverless application architecture, as described in reference documents of Amazon Web Services, Inc. entitled "AWS Lambda: Developer Guide," 2017, and "AWS Serverless Multi-Tier Architectures, Using Amazon API Gateway and AWS Lambda," November 2015, both of which are incorporated by reference herein.

These and other serverless application architectures referred to herein allow users to build and run applications without the need to provision, maintain or otherwise manage any servers. Although a given compute services platform implementing such an architecture may include servers, the applications are referred to as "serverless" in that the applications can be run and scaled without user reference to any particular server or servers and the user is therefore relieved of any server-related issues. The term "serverless" should therefore not be construed as indicating that a compute services platform or other processing platform that executes a given serverless application cannot include any servers. Advantages of serverless application architectures include scalability and reduced operational costs as well as finely-grained metering of compute services actually utilized by platform users. Again, other types of cloud-native applications can be used in other embodiments.

The compute services platform 105 in the embodiment of FIG. 1 illustratively comprises a cloud-native application manager 106 having an application programming interface (API) gateway 107. The cloud-native application manager 106 interacts with a cloud-native application backup orchestrator 108 that includes a recovery module 109.

The compute services platform 105 in the FIG. 1 embodiment further comprises cloud-native applications or CNAs 110. A given one of the cloud-native applications 110 is configured to utilize at least a subset of a plurality of micro-services 112-1, 112-2, . . . 112-M. Each of the micro-services 112 is associated with a different set of one or more underlying databases 114-1, 114-2, . . . 114-D. For example, one or more of the micro-services 112 may each be associated with only a single one of the databases 114. Additionally or alternatively, one or more of the micro-services 112 may each be associated with multiple ones of the databases 114. Accordingly, some of the micro-services 112 may have one-to-one relationships with respective ones of the underlying databases 114, while other ones of the micro-services 112 may have one-to-many relationships with multiple ones of the underlying databases 114. The term "database" as used herein is intended to be broadly construed, so as to encompass databases implemented as backend services, as well as other types of databases including relational databases, object stores and numerous other types of databases.

A given one of the cloud-native applications 110 executed in the compute services platform 105 under the control of the cloud-native application manager 106 therefore illustratively comprises one or more of the micro-services 112 utilizing one or more of the underlying databases 114. A wide variety of different micro-services 112 can be utilized in implementing the cloud-native application. The micro-services can be associated with numerous different types of databases 114. Examples of the databases 114 include AWS S3, GCP Cloud Storage, Microsoft Azure Blob Storage, DynamoDB, Amazon Aurora database and Oracle database, although many other databases could be used.

The cloud-native application backup orchestrator 108 utilizes directional dependency graphs to control capture and recovery of respective cloud-native applications, as will be described in more detail below. A given such directional dependency graph characterizes relationships between the micro-services 112 and the associated databases 114 utilized in executing the corresponding cloud-native application. For example, the directional dependency graph can include a plurality of nodes corresponding to respective ones of the databases 114, with directional edges interconnecting respective pairs of the nodes indicating directional dependencies between the corresponding databases 114. At least portions of such a directional dependency graph for a given one of the cloud-native applications 110 may be defined or otherwise specified by a user of that application. For example, the user can define the nodes of the directional dependency graph as corresponding to certain ones of the databases 114 and can further define directional dependencies between those databases 114 by defining directional edges between respective pairs of the nodes.

It is assumed that the compute services platform 105 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The cloud-native application manager 106 of the compute services platform 105 is configured to receive a request to execute one of the cloud-native applications 110 and to initiate execution of the cloud-native application responsive to the request. The request initiating execution of the cloud-native application is received in the API gateway 107 of the compute services platform 105 from one of the user devices 102 over network 104. The request to initiate execution of the cloud-native application can also be triggered by particular events, such as the creation of an object in an object store bucket, an operation on a database, and many other different types of events.

As noted above, a given one of the cloud-native applications 110 executed in the compute services platform 105 utilizes multiple ones of micro-services 112 each of which is associated with a different set of one or more underlying databases 114.

The cloud-native application backup orchestrator 108 is configured to capture state of the given cloud-native application for a particular point in time, and to perform operational recovery of the given cloud-native application for the particular point in time utilizing the captured state. Capturing state of the given cloud-native application for the particular point in time illustratively comprises capturing the state in accordance with a directional dependency graph that characterizes relationships between the micro-services 112 and the associated databases 114 utilized in executing the cloud-native application in order to ensure directional consistency between the databases 114 in the captured state. For example, a directional dependency between a given pair of databases may be based on an indication that entries of one of the databases point to entries of the other database.

Performing operational recovery of the cloud-native application for the particular point in time utilizing the captured state comprises performing the operational recovery in accordance with the directional dependency graph. The operational recovery is illustratively performed in the recovery module 109 of the cloud-native application backup orchestrator 108.

In some embodiments, a first one of the micro-services 112 utilized in executing the cloud-native application is dependent on a first one of the databases 114 and a second one of the micro-services 112 utilized in executing the cloud-native application is dependent on the first database and at least a second one of the databases 114 separate from the first database. For example, the second micro-service may be configured to store metadata in the first database and data objects associated with that metadata in the second database. The directional dependency graph in such an arrangement can be configured to indicate that the state of the second database is directionally dependent upon the state of the first database and therefore the state is captured for the first database before the state is captured for the second database in order to ensure directional consistency between the first and second databases. The directional dependency of the second database on the first database in this example is illustratively captured by a directional edge connecting a node corresponding the second database with a node corresponding to the first database. State is captured in this example in the reverse direction of the directional dependency between the first and second databases, in that state of the first database is captured before state of the second database, so as to ensure directional consistency between the first and second databases in the captured state.

One possible arrangement of this type arises when the first database comprises a relational database storing keys or other metadata associated with large objects that are stored in a second database comprising an "insert only" object store. The directional dependency in this example is dependency of the second database on the first database. Directional consistency is ensured by capturing state of the first database before capturing state of the second database, in the reverse direction of the directional dependency. The point in time for which state of the cloud-native application is captured in this example is effectively the time at which the copy of the first database is captured. This is a simple example with only two database nodes, but more complex arrangements may include much larger numbers of nodes having associated directional dependencies represented by directional edges interconnecting the nodes.

In some embodiments, capturing state of the cloud-native application for the particular point in time illustratively comprises creating backup copies of the corresponding ones of the databases 114 via respective copy APIs of those databases in accordance with a copy sequence defined by interconnections between nodes of the directional dependency graph.

Similarly, performing operational recovery of the cloud-native application for the particular point in time utilizing the captured state illustratively comprises recovering the corresponding ones of the databases 114 from backup copies via respective restore APIs of those databases in accordance with a restore sequence defined by interconnections between nodes of the directional dependency graph.

The directional dependency graph illustratively comprises a root node and a plurality of additional nodes, with each of at least a subset of the nodes corresponding to a different one of the databases 114.

In such an arrangement, capturing state of the cloud-native application for the particular point in time more particularly includes traversing multiple nodes of the directional dependency graph starting from the root node. In conjunction with traversing the nodes, the following operations are performed:

1. Create a backup copy of the database associated with a current one of the traversed nodes.

2. Recursively repeat the creating of a backup copy of operation 1 for other databases associated with respective other ones of the traversed nodes.

3. Store metadata comprising a pointer for each of the backup copies in a copy metadata store.

The copy metadata store is illustratively implemented using a storage system of the compute services platform 105. Such a copy metadata store may be part of or otherwise accessible to the recovery module 109.

Performing operational recovery of the cloud-native application for the particular point in time utilizing the captured state similarly comprises traversing multiple nodes of the directional dependency graph starting from the root node. In conjunction with traversing the nodes, the following operations are performed:

1. Read stored metadata for a backup copy of a database associated with a current one of the traversed nodes from the copy metadata store to obtain a pointer to that backup copy.

2. Restore the backup copy utilizing the obtained pointer.

3. Recursively repeat the reading and restoring of operations 1 and 2 for other databases associated with respective other ones of the traversed nodes.

The particular operations described above for capturing state of a cloud-native application and performing operational recovery of the cloud-native application from the captured state are examples only, and can be varied in other embodiments.

Although the micro-services 112 and databases 114 in the present embodiment are shown as part of the compute services platform 105, at least a subset of these micro-services and databases in other embodiments may be implemented on one or more other processing platforms that are accessible to the compute services platform 105 over one or more networks.

As described above, the cloud-native application backup orchestrator 108 in this embodiment is responsible for capturing state of all components of a given cloud-native application. The points in time at which backups of the cloud-native application are taken can be in accordance with intervals specified by a corresponding user. For example, a user associated with a particular enterprise or other organization can take into account business continuity requirements in establishing appropriate points in time at which backups of the cloud-native application will be taken. Such requirements can include service level agreements (SLAs) that may be in place with customers of the organization.

The cloud-native application backup orchestrator 108 in some embodiments is implemented as part of an orchestration layer implemented in an otherwise conventional cloud-native application architecture implemented in the compute services platform 105. Other system components such as the cloud-native application manager 106 can interact with such an orchestration layer of the compute services platform 105.

In the FIG. 1 embodiment, the compute services platform 105 is assumed to comprise one or more storage systems configured to store information characterizing the cloud-native applications 110. For example, such a storage system can be configured to incorporate the previously-described copy metadata store.

Such storage systems can comprise any of a variety of different types of storage including network-attached storage (NAS), storage area networks (SANs), direct-attached storage (DAS) and distributed DAS, as well as combinations of these and other storage types, including software-defined storage.

Other particular types of storage products that can be used in implementing a given storage system of compute services platform 105 in an illustrative embodiment include VNX® and Symmetrix VMAX® storage arrays, flash hybrid storage products such as Unity™, software-defined storage products such as ScaleIO™ and ViPR®, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

The term "processing platform" as used herein is intended to be broadly construed so as to encompass, by way of illustration and without limitation, multiple sets of processing devices and one or more associated storage systems that are configured to communicate over one or more networks.

As a more particular example, the cloud-native application manager 106 and cloud-native application backup orchestrator 108 can each be implemented in the form of one or more LXCs running on one or more VMs. Other arrangements of one or more processing devices of a processing platform can be used to implement the cloud-native application manager 106 and cloud-native application backup orchestrator 108 as well as other components of the compute services platform 105. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the compute services platform 105 to reside in different data centers. Numerous other distributed implementations of the compute services platform 105 are possible.

Accordingly, one or both of the cloud-native application manager 106 and the cloud-native application backup orchestrator 108 can each be implemented in a distributed manner so as to comprise a plurality of distributed components implemented on respective ones of the plurality of compute nodes of the compute services platform 105.

Although illustratively shown as being implemented within the compute services platform 105, components such as cloud-native application manager 106 and cloud-native application backup orchestrator 108 in other embodiments can be implemented at least in part externally to the compute services platform 105. For example, such components can each be implemented at least in part within another system element or at least in part utilizing one or more stand-alone components coupled to the network 104.

It is to be appreciated that these and other features of illustrative embodiments are presented by way of example only, and should not be construed as limiting in any way.

Accordingly, different numbers, types and arrangements of system components such as cloud-native application manager 106 and cloud-native application backup orchestrator 108 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments functionality for automated capture and recovery of cloud-native applications can be offered to cloud infrastructure customers or other users as part of an FaaS or PaaS offering.

Figure 2:
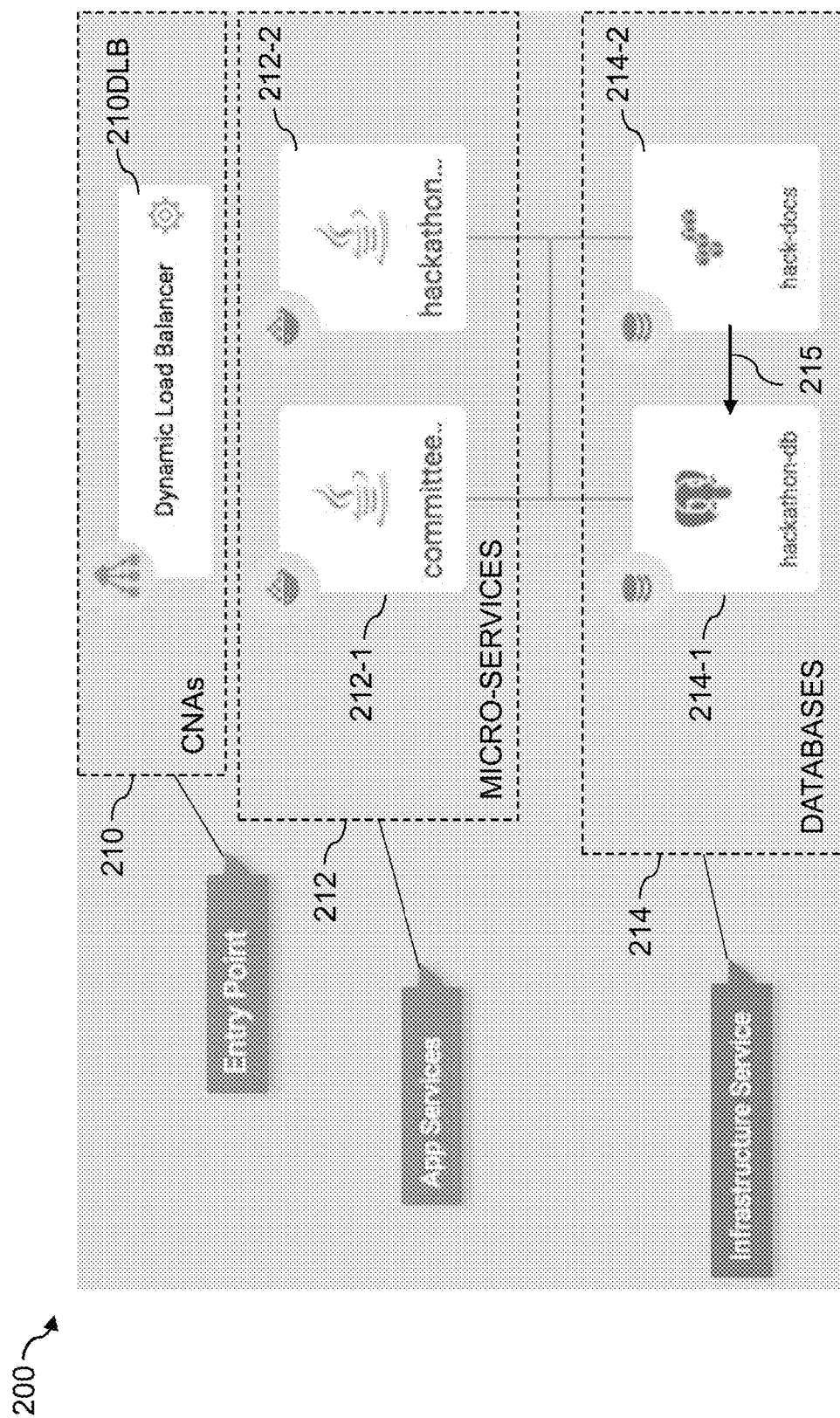
FIG. 2 shows an example of a cloud-native application that utilizes multiple micro-services each associated with a distinct set of one or more databases in an information processing system in an illustrative embodiment.

FIG. 2 shows an information processing system 200 that executes cloud-native applications 210 in another illustrative embodiment. The cloud-native applications 210 in this embodiment more particularly comprise a dynamic load balancer application 210DLB that utilizes multiple micro-services 212 each associated with a distinct set of one or more databases 214 in an illustrative embodiment. More particularly, in the context of the FIG. 2 embodiment, the micro-services 212 include a committee micro-service 212-1 that is dependent on a postgres database 214-1 denoted hackathon-db, and a hackathon micro-service 212-2 that is dependent both on the postgres database 214-1 and an S3 database 214-2 denoted hack-docs. Both of the micro-services 212-1 and 212-2 are bound to the dynamic load balancer application 210DLB that exposes an interface to the corresponding user.

In this embodiment, hackathon metadata is stored in the postgres database 214-1 while related documents are stored in the S3 database 214-2. This arrangement gives rise to a directional dependency 215 between the databases 214. The directional dependency is more particularly a dependency of the S3 database 214-2 on the postgres database 214-1. Directional consistency is ensured by capturing state of the postgres database 214-1 before capturing state of the S3 database 214-2, in the reverse direction of the directional dependency, assuming that the databases 214 do not delete metadata or documents but instead no longer point to them if deleted. The point in time for which state of the dynamic load balancer application 210DLB is captured in this example is effectively the time at which the copy of the postgres database 214-1 is captured. Again, this is a simple example with only two database nodes, but more complex arrangements will typically include much larger numbers of nodes having associated directional dependencies represented by directional edges interconnecting the nodes.

In the FIG. 2 embodiment, the dynamic load balancer application 210DLB represents an entry point providing access to multiple application ("app") services represented by the respective micro-services 212. The databases 214 are illustratively implemented as respective infrastructure services of the system 200.

The directional dependency graph is utilized in this embodiment and other embodiments to control state capture and operational recovery for the cloud-native application. An administrator or other user of a given cloud-native application can define or otherwise configure at least portions of the directional dependency graph for that application.

The state capture for the cloud-native application in some embodiments utilizes existing copy APIs for respective databases associated with nodes in the graph. Similarly, the operational recovery for the cloud-native application in some embodiments utilizes existing restore APIs for respective databases associated with nodes in the graph. These embodiments therefore copy and restore functionality associated with state capture and operational recovery to existing copy APIs and restore APIs. For example, an AWS Relational Database Service (RDS) Copy API and AWS RDS Restore API can be used in some embodiments involving AWS databases. Other types of APIs may be used for deleting old copies and implementing other functionality such as scheduling backups and specifying a retention policy for backups.

It is to be appreciated that the particular application, micro-service, database and dependency arrangements illustrated in the embodiment of FIG. 2 are presented by way of example only and can be varied in other embodiments.

The operation of another illustrative embodiment will now be described with reference to the flow diagram of FIG. 3. The process as shown includes steps 300 through 304, and is suitable for use in the information processing system 100 but is more generally applicable to other types of information processing systems comprising compute services platforms configured to run cloud-native applications.

In step 300, a cloud-native application is executed utilizing a plurality of micro-services each associated with a different set of one or more underlying databases. The cloud-native application may be executed responsive to a request received from one of the system users via an API.

In step 302, state of the cloud-native application for a particular point in time is captured in accordance with a directional dependency graph that characterizes relationships between the micro-services and the associated databases in order to ensure directional consistency between the databases in the captured state.

For example, capturing state of the cloud-native application for the particular point in time illustratively comprises traversing multiple nodes of the directional dependency graph starting from a root node. In conjunction with the traversing of the nodes of the directional dependency graph, the process creates a backup copy of the database associated with a current one of the traversed nodes, recursively repeats the creating of a backup copy for other databases associated with respective other ones of the traversed nodes, and stores metadata comprising a pointer for each of the backup copies in a copy metadata store.

In step 304, operational recovery of the cloud-native application is performed for the particular point in time utilizing the captured state in accordance with the directional dependency graph.

For example, performing operational recovery of the cloud-native application for the particular point in time utilizing the captured state comprises traversing multiple nodes of the directional dependency graph starting from the root node. In conjunction with the traversing of the nodes of the directional dependency graph, the process reads stored metadata for a backup copy of a database associated with a current one of the traversed nodes from the copy metadata store to obtain a pointer to that backup copy, restores the backup copy utilizing the obtained pointer, and recursively repeats the reading and restoring for other databases associated with respective other ones of the traversed nodes.

As mentioned previously, in some embodiments the state of the cloud-native application is captured at each of a plurality of different points in time. Users may then be permitted to select at least one of a plurality of cloud-native application backups characterizing the captured state for respective ones of the points in time. The cloud-native application is then recovered using the selected at least one of the cloud-native application backups.

In the context of the FIG. 1 embodiment, the cloud-native application manager 106 and the cloud-native application backup orchestrator 108 are illustratively configured to control the performance of steps 300 through 304 of the FIG.

3 process. Other system entities can additionally or alternatively be utilized to control or execute one or more of these steps.

Figure 3:
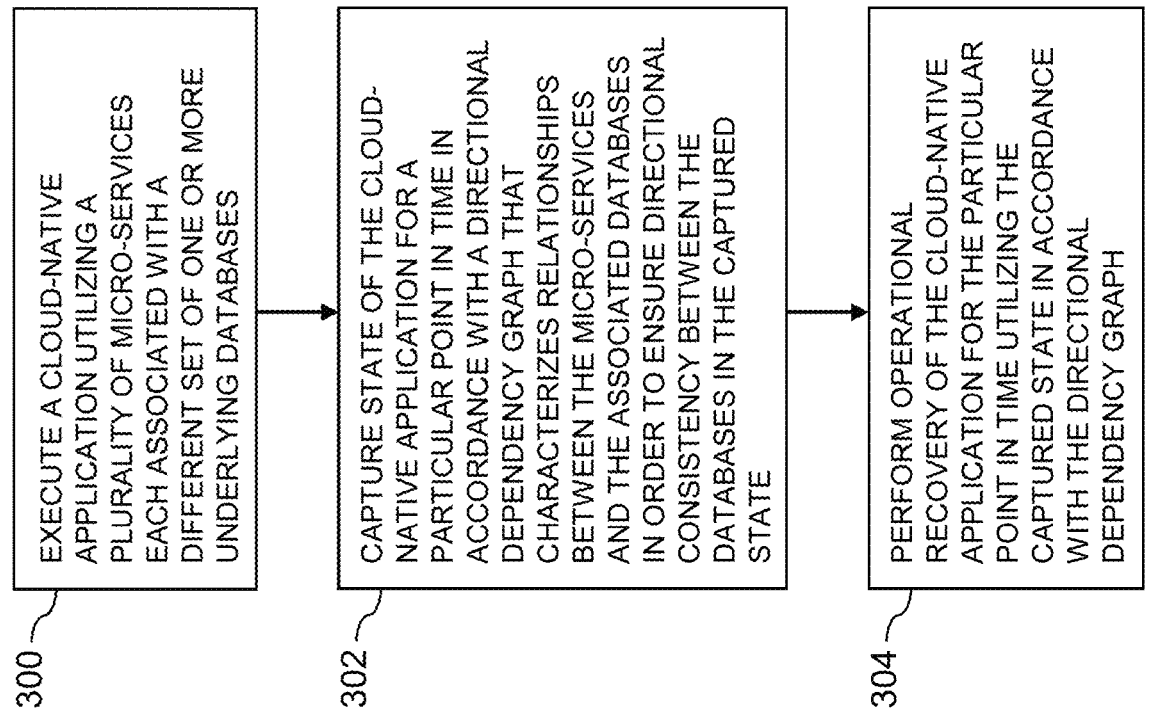
FIG. 3 is a flow diagram of a process utilizing a directional dependency graph for state capture and operational recovery of a cloud-native application in an illustrative embodiment.

It is to be appreciated that the FIG. 3 process and other cloud-native application state capture and recovery features and functionality described above can be adapted for use with other types of information systems configured to execute cloud-native applications on a compute services platform or other type of processing platform.

The particular processing operations and other system functionality described in conjunction with the flow diagram of FIG. 3 are therefore presented by way of illustrative example only, and should not be construed as limiting the scope of the disclosure in any way. Alternative embodiments can use other types of processing operations involving execution of cloud-native applications. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different cloud-native applications with respective state capture and operational recovery functionality within a given information processing system.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with automated capture and recovery of cloud-native application state as disclosed herein can provide a number of significant advantages relative to conventional arrangements.

For example, some embodiments are configured to implement automated state capture and operational recovery of cloud-native applications utilizing a corresponding directional dependency graph to ensure directional consistency in the capture and recovery operations. Such embodiments can advantageously provide directional consistency in automated state capture and operational recovery of cloud-native applications from desired points in time.

These and other embodiments automate the backup orchestration of cloud-native applications in a particularly efficient and effective manner, thereby overcoming the difficulties otherwise associated with conventional backups of cloud-native applications that utilize multiple micro-services each of which may be dependent upon different sets of one or more underlying databases.

For example, illustrative embodiments allow organizations and other users to obtain the advantages of a cloud-native application architecture without compromising service level agreements of their implemented applications.

Furthermore, the disclosed techniques can be implemented for a wide variety of different types of distributed applications implemented using cloud-based micro-services without the need to modify the applications in any way.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as the compute services platform 105 or portions thereof are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as AWS S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. Although described in the context of system 100, these platforms may also be used to implement at least portions of other information processing systems in other embodiments.

Figure 4:
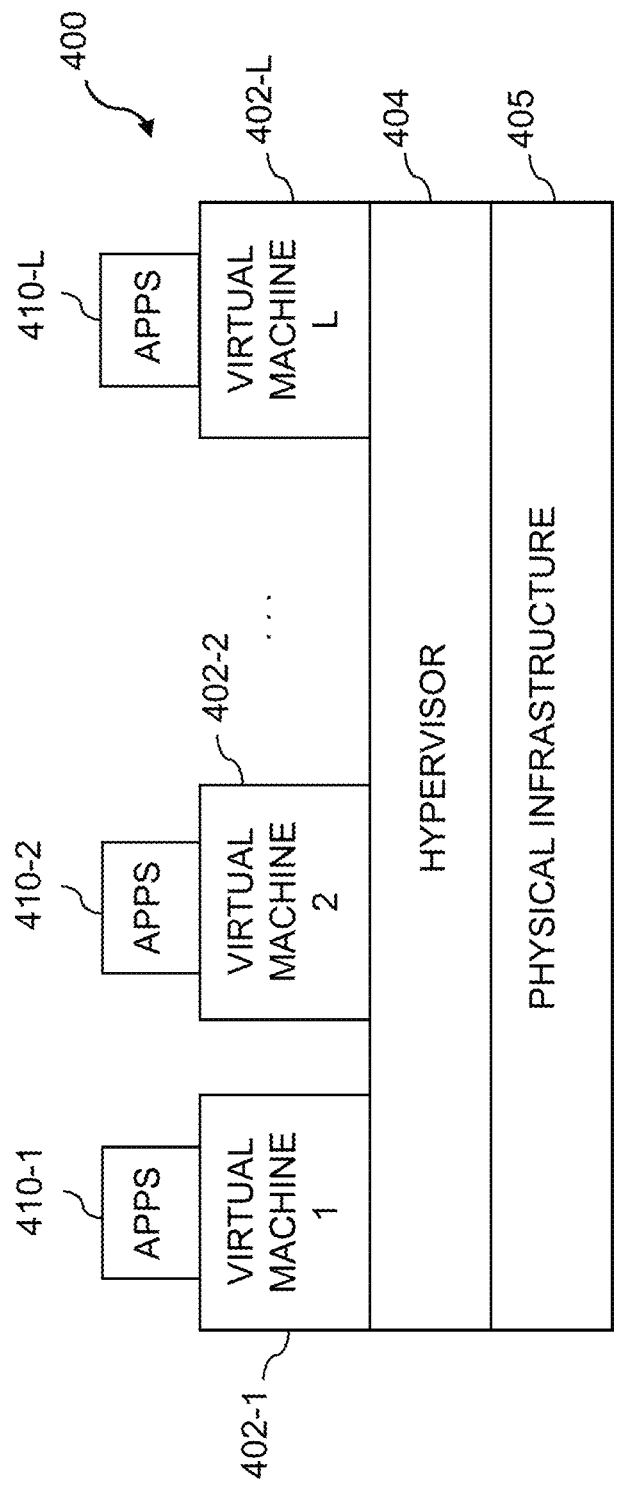
FIGS. 4 and 5 show examples of processing platforms that may be utilized to implement at least a portion of an information processing system in illustrative embodiments.
Figure 5:
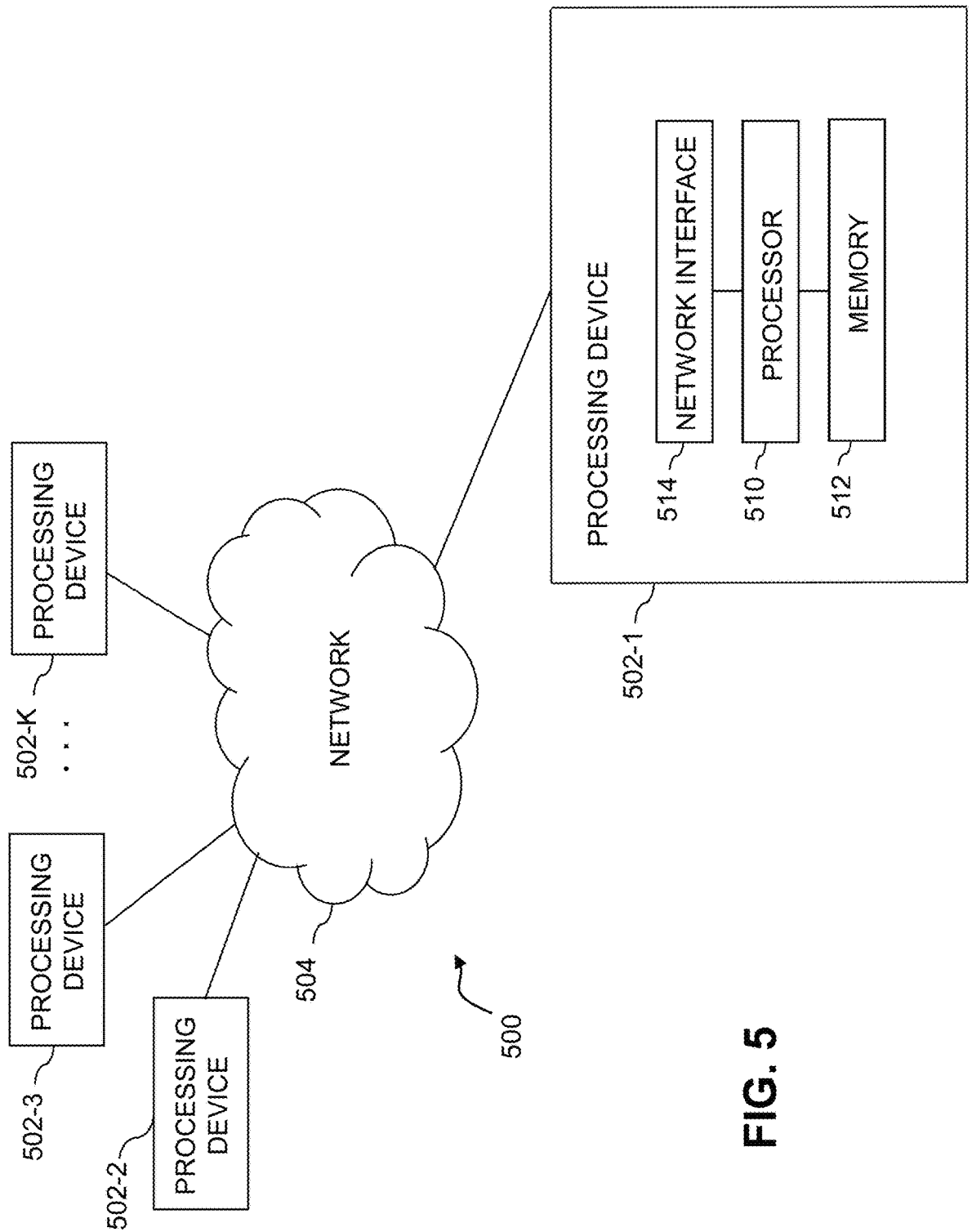

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises virtual machines (VMs) 402-1, 402-2, . . . 402-L implemented using a hypervisor 404. The hypervisor 404 runs on physical infrastructure 405. The cloud infrastructure 400 further comprises sets of applications 410-1, 410-2, . . . 410-L running on respective ones of the virtual machines 402-1, 402-2, . . . 402-L under the control of the hypervisor 404.

Although only a single hypervisor 404 is shown in the embodiment of FIG. 4, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 404 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 105 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, compute services platforms, cloud-native applications, cloud-native application managers, cloud-native backup orchestrators, micro-services and databases. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing platform comprising a plurality of processing devices;
said at least one processing platform being configured:
to execute a cloud-native application utilizing a plurality of micro-services each associated with a different set of one or more underlying databases;
to capture state of the cloud-native application for a particular point in time; and
to perform operational recovery of the cloud-native application for the particular point in time utilizing the captured state;
wherein capturing state of the cloud-native application for the particular point in time comprises:
capturing the state in accordance with a directional dependency graph that characterizes relationships between the micro-services and the associated databases utilized in executing the cloud-native application in order to ensure directional consistency between the databases in the captured state, the directional dependency graph comprising a root node and a plurality of additional nodes and wherein each of at least a subset of the nodes corresponds to a different one of the databases; and
creating backup copies of the databases via respective copy application programming interfaces in accordance with a copy sequence defined by interconnections between nodes of the directional dependency graph;
wherein capturing state of the cloud-native application for the particular point in time further comprises:
traversing multiple nodes of the directional dependency graph starting from the root node; and
in conjunction with the traversing:
creating a backup copy of the database associated with a current one of the traversed nodes;
recursively repeating said creating of a backup copy for other databases associated with respective other ones of the traversed nodes; and
storing metadata comprising a pointer for each of the backup copies in a copy metadata store; and
wherein performing operational recovery of the cloud-native application for the particular point in time utilizing the captured state comprises performing the operational recovery in accordance with the directional dependency graph by:
traversing multiple nodes of the directional dependency graph starting from the root node; and
in conjunction with the traversing:
reading stored metadata for a backup copy of a database associated with a current one of the traversed nodes from a copy metadata store to obtain a pointer to that backup copy;
restoring the backup copy utilizing the obtained pointer; and
recursively repeating said reading and restoring for other databases associated with respective other ones of the traversed nodes.

2. The apparatus of claim 1 wherein the cloud-native application is executed responsive to a request received in an application programming interface gateway of the processing platform from a user device over a network.

3. The apparatus of claim 1 wherein a first one of the plurality of micro-services utilized in executing the cloud-native application is dependent on a first database and a second one of the plurality of micro-services utilized in executing the cloud-native application is dependent on the first database and at least a second database separate from the first database.

4. The apparatus of claim 3 wherein the second micro-service stores metadata in the first database and data objects in the second database.

5. The apparatus of claim 4 wherein the directional dependency graph indicates that state of the second database is directionally dependent upon state of the first database and therefore state is captured for the first database before state is captured for the second database in order to ensure directional consistency between the first and second databases.

6. The apparatus of claim 1 wherein the directional dependency graph is at least partially defined by a user of the cloud-native application.

7. The apparatus of claim 1 wherein performing operational recovery of the cloud-native application for the particular point in time utilizing the captured state comprises recovering the databases from backup copies via respective restore application programming interfaces in accordance with a restore sequence defined by interconnections between nodes of the directional dependency graph.

8. The apparatus of claim 1 wherein processing platform comprises a cloud-native application backup orchestrator configured to capture state of the cloud-native application and to perform operational recovery of the cloud-native application.

9. The apparatus of claim 1 wherein each of at least a subset of the micro-services is associated with a different one of the databases.

10. The apparatus of claim 1 wherein each of at least a subset of the micro-services is associated with multiple ones of the databases.

11. A method comprising:
executing a cloud-native application utilizing a plurality of micro-services each associated with a different set of one or more underlying databases;
capturing state of the cloud-native application for a particular point in time; and
performing operational recovery of the cloud-native application for the particular point in time utilizing the captured state;
wherein capturing state of the cloud-native application for the particular point in time comprises:
capturing the state in accordance with a directional dependency graph that characterizes relationships between the micro-services and the associated databases utilized in executing the cloud-native application in order to ensure directional consistency between the databases in the captured state, the directional dependency graph comprising a root node and a plurality of additional nodes and wherein each of at least a subset of the nodes corresponds to a different one of the databases; and
creating backup copies of the databases via respective copy application programming interfaces in accordance with a copy sequence defined by interconnections between nodes of the directional dependency graph;
wherein capturing state of the cloud-native application for the particular point in time further comprises:

traversing multiple nodes of the directional dependency graph starting from the root node; and in conjunction with the traversing:

creating a backup copy of the database associated with a current one of the traversed nodes;

recursively repeating said creating of a backup copy for other databases associated with respective other ones of the traversed nodes; and storing metadata comprising a pointer for each of the backup copies in a copy metadata store;

wherein performing operational recovery of the cloud-native application for the particular point in time utilizing the captured state comprises performing the operational recovery in accordance with the directional dependency graph by:

traversing multiple nodes of the directional dependency graph starting from the root node; and in conjunction with the traversing:

reading stored metadata for a backup copy of a database associated with a current one of the traversed nodes from a copy metadata store to obtain a pointer to that backup copy;

restoring the backup copy utilizing the obtained pointer; and recursively repeating said reading and restoring for other databases associated with respective other ones of the traversed nodes; and wherein the method is performed by at least one processing platform comprising a plurality of processing devices.

12. A computer program product comprising a non-transitory processor-readable storage medium having stored therein program code of one or more software programs, wherein the program code when executed by at least one processing platform causes said at least one processing platform:

to execute a cloud-native application utilizing a plurality of micro-services each associated with a different set of one or more underlying databases;

to capture state of the cloud-native application for a particular point in time; and to perform operational recovery of the cloud-native application for the particular point in time utilizing the captured state;

wherein capturing state of the cloud-native application for the particular point in time comprises:

capturing the state in accordance with a directional dependency graph that characterizes relationships between the micro-services and the associated databases utilized in executing the cloud-native application in order to ensure directional consistency between the databases in the captured state, the directional dependency graph comprising a root node and a plurality of additional nodes and wherein each of at least a subset of the nodes corresponds to a different one of the databases; and creating backup copies of the databases via respective copy application programming interfaces in accordance with a copy sequence defined by interconnections between nodes of the directional dependency graph;

wherein capturing state of the cloud-native application for the particular point in time further comprises:

traversing multiple nodes of the directional dependency graph starting from the root node; and in conjunction with the traversing:

creating a backup copy of the database associated with a current one of the traversed nodes;

recursively repeating said creating of a backup copy for other databases associated with respective other ones of the traversed nodes; and storing metadata comprising a pointer for each of the backup copies in a copy metadata store; and wherein performing operational recovery of the cloud-native application for the particular point in time utilizing the captured state comprises performing the operational recovery in accordance with the directional dependency graph by:

traversing multiple nodes of the directional dependency graph starting from the root node; and in conjunction with the traversing:

reading stored metadata for a backup copy of a database associated with a current one of the traversed nodes from a copy metadata store to obtain a pointer to that backup copy;

restoring the backup copy utilizing the obtained pointer; and recursively repeating said reading and restoring for other databases associated with respective other ones of the traversed nodes.

13. The computer program product of claim 12 wherein a first one of the plurality of micro-services utilized in executing the cloud-native application is dependent on a first database and a second one of the plurality of micro-services utilized in executing the cloud-native application is dependent on the first database and at least a second database separate from the first database.

14. The computer program product of claim 13 wherein the second micro-service stores metadata in the first database and data objects in the second database.

15. The computer program product of claim 14 wherein the directional dependency graph indicates that state of the second database is directionally dependent upon state of the first database and therefore state is captured for the first database before state is captured for the second database in order to ensure directional consistency between the first and second databases.

16. The computer program product of claim 12 wherein performing operational recovery of the cloud-native application for the particular point in time utilizing the captured state comprises recovering the databases from backup copies via respective restore application programming interfaces in accordance with a restore sequence defined by interconnections between nodes of the directional dependency graph.

17. The method of claim 11 wherein a first one of the plurality of micro-services utilized in executing the cloud-native application is dependent on a first database and a second one of the plurality of micro-services utilized in executing the cloud-native application is dependent on the first database and at least a second database separate from the first database.

18. The method of claim 17 wherein the second micro-service stores metadata in the first database and data objects in the second database.

19. The method of claim 18 wherein the directional dependency graph indicates that state of the second database is directionally dependent upon state of the first database and therefore state is captured for the first database before state is captured for the second database in order to ensure directional consistency between the first and second databases.

20. The method of claim 11 wherein performing operational recovery of the cloud-native application for the particular point in time utilizing the captured state comprises recovering the databases from backup copies via respective restore application programming interfaces in accordance with a restore sequence defined by interconnections between nodes of the directional dependency graph.

* * * * *